April 15, 1952     E. J. PATTERSON     2,593,176
TOOL BAR MOUNTING
Filed Feb. 16, 1946     2 SHEETS—SHEET 1
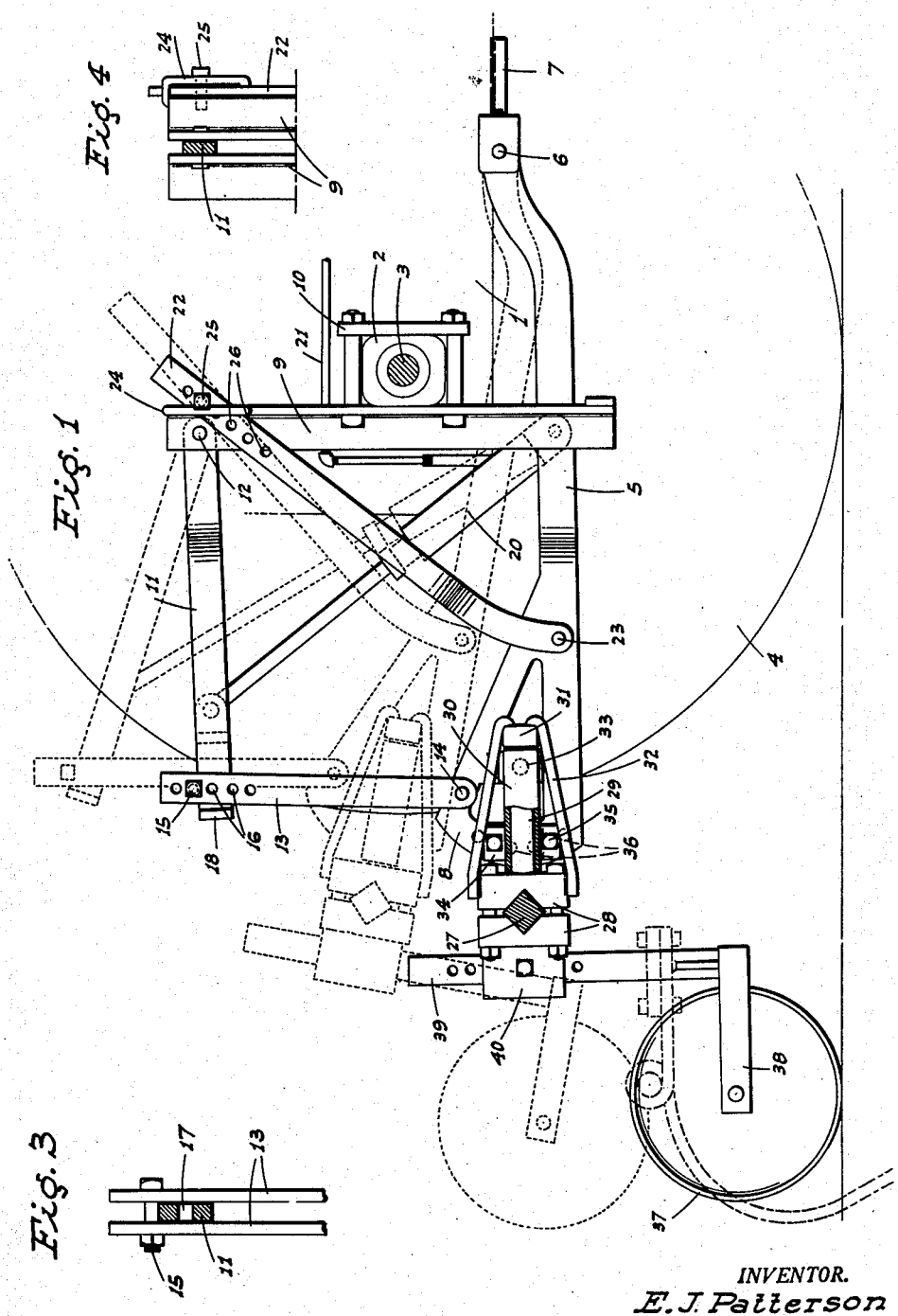
INVENTOR.
E. J. Patterson
BY
ATTYS

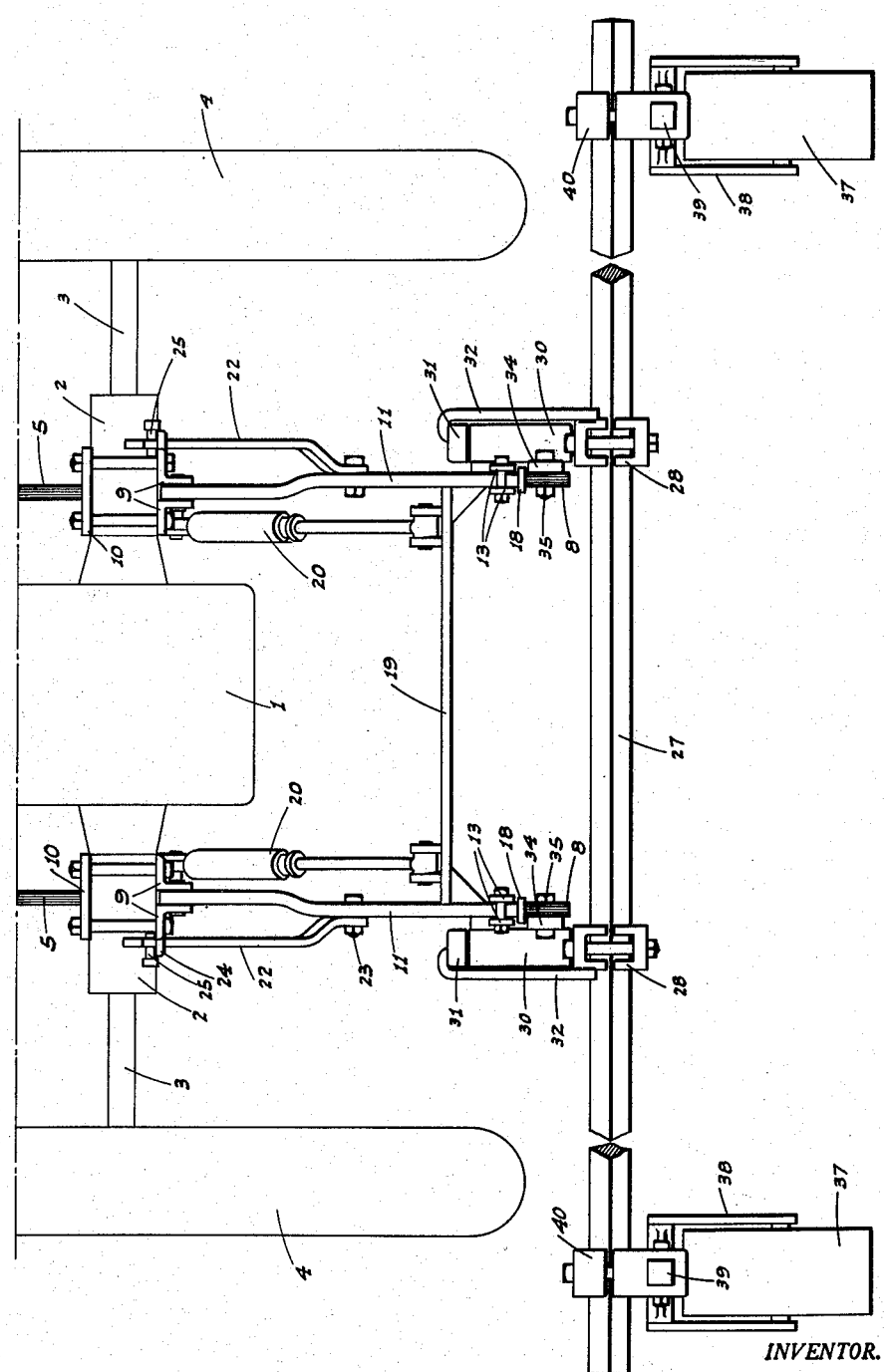

Patented Apr. 15, 1952

2,593,176

UNITED STATES PATENT OFFICE 2,593,176

TOOL BAR MOUNTING

Edie J. Patterson, Stockton, Calif.

Application February 16, 1946, Serial No. 648,104

3 Claims. (Cl. 97—47)

This invention is directed to, and it is an object to provide, an improved tool bar mounting for agricultural tractors.

Another object of the invention is to provide a tool bar mounting, as above, which is arranged for power adjustment to regulate the working depth of the tools on the bar, yet is constructed to permit of vertical upward floating movement of the tool bar above its set working position.

A further object of the present invention is to provide a tool bar mounting, as in the preceding paragraph, which is provided with means to secure the mounting against such vertical floating movement, if working conditions so require.

An additional object of this invention is to provide a tool bar mounting wherein the transverse tool bar is mounted for up or down pivotal adjustment about a transverse horizontal axis ahead thereof, whereby to alter the working angle, lengthwise of the implement, of ground penetrating tools, such as cultivator teeth, mounted on and projecting downwardly from said tool bar.

It is also an object of this invention to provide a tool bar mounting which can be releasably locked in a raised position, with the tools above ground, for transport from place to place.

A further object of the invention is to produce a simple and inexpensive device, and yet one which will be exceedingly effective for the purpose for which it is designed.

These objects are accomplished by means of such structure and relative arrangement of parts as will fully appear by a perusal of the following specification and claims.

In the drawings similar characters of reference indicate corresponding parts in the several views:

Figure 1 is a side elevation of the improved tool bar mounting as connected to a tractor; the mounting being shown in working position in full lines, and in raised or transport position in dotted lines.

Figure 2 is a plan view of the implement as mounted on a tractor.

Figure 3 is a fragmentary transverse elevation showing the cooperative relationship between one of the top beams and the upper portion of the corresponding suspension links.

Figure 4 is a fragmentary transverse elevation of the upper end portion of one of the post units showing the manner of connection of the adjacent end of the corresponding top beam thereto, and the locking arrangement with the upper end portion of the corresponding holding link.

Referring now more particularly to the characters of reference on the drawings, the tool mounting is shown as mounted in connection with a tractor which includes a rear end case 1 which includes laterally outwardly projecting axle housings 2 surrounding the axles 3 on which ground engaging wheels 4 are secured.

A pair of drop center draft beams 5 extend under the axles on opposite sides of the case 1, and are transversely pivotally connected to said case ahead of the axles, as at 6; the pivots being carried on attachment plates 7 secured to an adjacent portion of the case. The draft beams 5 extend some distance to the rear of the axles 3 and terminate in laterally facing quadrants 8, whose purpose will hereinafter be described.

Intermediate their ends the draft beams 5 extend in guided relation through vertically slotted, upstanding post units 9 fixed in connection with corresponding axle housings 2 by means of clamps 10. The post units 9 are formed, as shown, by a pair of angle irons, with corresponding flanges thereof disposed in adjacent spaced facing relation.

A longitudinally extending top beam 11 is disposed above each of the draft beams 5, and said top beams are pivotally connected, at their forward ends, as at 12, between the angle irons of the corresponding post unit 9.

Each of the draft beams 5, adjacent the rear end thereof and at substantially the top of the quadrant 8, is fitted with a transversely spaced pair of upstanding suspension links 13 pivotally connected to said draft beam, as at 14. A bolt 15 extends in vertically adjustable relation through matching holes 16 of rows thereof in each pair of the suspension links 13 adjacent the upper end thereof. Each top beam 11 normally extends between the corresponding suspension links 13 directly below the bolt 15, although if desired said bolt may be passed through a hole 17 in said top beam. At its rear end each top beam 11 includes a head 18 to prevent escape of said beam from between the suspension links 13.

A horizontal cross bar 19 connects the top beams 11 adjacent their rear ends but ahead of the pairs of suspension links 13, and a pair of fluid pressure actuated power cylinders 20 are pivotally connected between said cross bar adjacent the top beams 11 and the corresponding post units 9 adjacent the lower ends of the latter. The power cylinders 20 are arranged in a fluid pressure supply system, shown in part at 21, and which includes valve means (not shown) operable by the tractor operator, so that said operator may control actuation of the cylinders 20.

It will be seen that the position of the rear ends of the draft beams above ground may be regulated by operation of the power cylinders 20.

A pair of holding, transversely spaced links 22 are pivotally connected, at their lower ends, as at 23, to corresponding draft beams 5 between the post units 9 and quadrants 8; said holding links extending at a forward and upward incline through slots formed by members 24 on the upper ends of adjacent post units 9. Beyond or ahead of the members 24 the holding links 22 are each provided with a removable cross pin 25, which pin is adapted to be selectively engaged in any one of a row of holes 26 in said link.

A horizontal, transverse tool bar 27 is disposed adjacent but to the rear of the draft beams 5, and adjacent each such beam the tool bar is fitted with a clamp 28 having a spindle 29 projecting forwardly therefrom and turnably engaging in a corresponding sleeve 30. A head 31 on the forward end of each spindle prevents retraction of the latter from the corresponding sleeve 30. Each spindle 29 is stabilized by tie straps 32 which extend from the head 31 to the adjacent end of the clamp 28. Each sleeve 30 intersects the corresponding quadrant 8 and is transversely pivoted, as at 33, adjacent the axis of the quadrant for adjustment vertically. Adjacent the corresponding clamp 28 each sleeve 30 includes top and bottom ears 34 vertically adjustably secured to the adjacent quadrant 8 by bolts 35 which engage in selected ones of a row of holes 36 in said quadrant.

By adjustably mounting each sleeve and spindle assembly, as above, the tool bar 27 is vertically adjustable about a transverse horizontal axis ahead thereof, i. e. pivot 33. Such vertical adjustment of the transverse tool bar is for the purpose of altering the angle, lengthwise of the direction of travel, of tools (not shown) which depend from the tool bar 27.

Adjacent its outer ends the tool bar 27 is supported by ground engaging wheels 37, each carried in a yoke 38 supported by a standard 39 vertically adjustably secured in a clamp 40 on the tool bar.

In use of the above described tool bar mounting, the power cylinders 20 are first actuated to adjust the tool bar 27, and the tools thereon to a desired working position; the cross bolts 15 serving to prevent downward movement of the suspension links 13, and consequently the draft beams 5 below said set working position. However, as the bolts 15 are normally disposed for abutting engagement with the upper edges of corresponding top beams 11, the suspension links 13 and draft beams 5, together with the tool bar and supported tools, are capable of vertical floating motion above said working position, and which motion may result from the implement traversing uneven ground. Such vertical floating motion above the set or lowermost working position is desirable.

In order to further assure that the draft beams do not lower below the set working position, the cross pins 25 are engaged in certain of the holes 26 in the holding links 22, whereby to limit retraction of the latter, but permitting of upward sliding movement or advance thereof as said draft beams 5 float vertically above said working position.

By reason of the spindle and sleeve units which connect the tool bar supporting clamps 28 with the draft beams 5, the tool bar can rise or fall differentially at the ends thereof without any binding occuring at the points of connection with said draft beams. This is another important feature of the invention, as it permits the draft beam to fluctuate in its end positions corresponding to ground contour, with the result that the tools on the tool bar produce a more effective ground working action.

If it is desired, under certain working conditions, to prevent vertical flotation of the draft beams 5 and supporting tool bar 27, the bolts 15 are withdrawn from the suspension links 13 and then reinserted therein, with said bolts extending through the holes 17 in the top beams 11. With the suspension links and top beams so connected together the assembly is rigid against vertical movement, except as results from operation of the power cylinders 20.

When the implement is to be transported from place to place the power cylinders 20 are actuated to raise the entire assembly to the position shown in dotted lines in Fig. 1, and in such position the cross pins 25 are secured in holes 26 of the holding links 22 to maintain such transport position of the assembly, and to relieve the strain on the cylinders 20.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent is desired:

1. In combination with a pair of spaced-apart draft beams attached to a tractor; a pair of clamps for engagement about a tool bar, means swivelly connecting the clamps to the ends of the draft beams, such means including a sleeve extending lengthwise of the tractor and mounted on the end of each draft beam, a spindle rigid with and projecting from each clamp and turnably mounted in one of the sleeves, means to maintain each spindle in its corresponding sleeve; each sleeve being pivoted on its corresponding draft beam for vertical swinging adjustment relative to and in a plane lengthwise of such beam, and means to fix the sleeve to the beam in any adjusted position.

2. A combination as in claim 1 in which said last named means comprises a quadrant on the end of each draft bar provided with a plurality of spaced bolt holes, ears on the sleeve provided with orifices which may be brought into register with the orifices in the quadrant, and bolt adapted to be secured through such registered orifices.

3. In combination with a pair of spaced-apart draft beams attached to a tractor; a pair of clamps for engagement about a tool bar, means swivelly connecting the clamps to the ends of the draft beams, such means including a sleeve extending lengthwise of the tractor and mounted on the end of each draft beam, a spindle rigid with and projecting from each clamp and turnably mounted in one of the sleeves, means to maintain each spindle in its corresponding sleeve; said last named means comprising an enlarged head on the spindle beyond the sleeve, and a diagonal tie member rigidly connecting the head and clamp below and clear of the sleeve.

EDIE J. PATTERSON.

REFERENCES CITED

The following references are of record in the file of this patent:

UNITED STATES PATENTS

| Number | Name | Date |
|---|---|---|
| 521,272 | Schauman | June 12, 1894 |
| 1,575,011 | Seaholm | Mar. 2, 1926 |
| 1,946,664 | Benjamin | Feb. 13, 1934 |
| 2,097,841 | Park | Nov. 2, 1937 |
| 2,133,180 | Tuft | Oct. 11, 1938 |
| 2,203,941 | Brunner | June 11, 1940 |
| 2,222,115 | Mott | Nov. 19, 1940 |
| 2,247,680 | Graham | July 1, 1941 |
| 2,306,744 | Morkoski | Dec. 29, 1942 |
| 2,318,194 | Brown | May 4, 1943 |
| 2,324,840 | Hipple | July 20, 1943 |
| 2,340,165 | Young | Jan. 25, 1944 |
| 2,341,824 | Smith | Feb. 15, 1944 |
| 2,357,848 | Ray | Sept. 12, 1944 |
| 2,381,552 | Mott | Aug. 7, 1945 |
| 2,383,386 | Hipple | Aug. 21, 1945 |